United States Patent [19]
Mullins

[11] 3,911,219
[45] Oct. 7, 1975

[54] AUTOMATIC FREQUENCY CONTROL FOR DIFFERENTIALLY COHERENT PHASE DETECTION

[75] Inventor: Joe Hill Mullins, Fair Haven, N.J.

[73] Assignee: Bell Telephone Laboratories, Incorporated, Murray Hill, N.J.

[22] Filed: Mar. 11, 1974

[21] Appl. No.: 450,090

[52] U.S. Cl. .................... 178/88; 325/320; 325/418
[51] Int. Cl.[2] .................... H04L 27/16; H04L 27/23
[58] Field of Search ........ 178/67, 88; 325/320, 346, 325/418–423, 433; 329/112, 122, 124; 328/133

[56] References Cited

UNITED STATES PATENTS

| | | | |
|---|---|---|---|
| 3,479,600 | 10/1969 | Miller | 325/423 |
| 3,638,125 | 1/1972 | Goell | 178/67 |
| 3,808,541 | 4/1974 | Baker et al. | 325/346 |

*Primary Examiner*—Benedict V. Safourek
*Attorney, Agent, or Firm*—John J. Torrente; John K. Mullarney

[57] ABSTRACT

Automatic frequency control apparatus is provided for controlling the carrier frequency of a differentially coherent phase-shift keyed (DC-PSK) carrier signal. More particularly, the binary signal carried via the DC-PSK carrier signal, after recovery therefrom, is multiplied by the output signal from a quadrature differential phase detector to generate a product signal which, when averaged, has polarities which are indicative of whether the carrier frequency has increase or decreased from a preselected value. The generated product signal thus can be used as an error control signal for maintaining the carrier frequency at such preselected value.

11 Claims, 16 Drawing Figures

AUTOMATIC FREQUENCY CONTROL FOR DIFFERENTIALLY COHERENT PHASE DETECTION

BACKGROUND OF THE INVENTION

This invention relates to data communications and, in particular, to apparatus for providing automatic frequency control in the differential detection of phase-shift keyed signals.

It has become well known in the communications art to employ phase-shift keying techniques to transmit a binary signal. In one such technique, generally referred to as differentially coherent phase-shift keying (DC-PSK), each of the two states of the binary signal is encoded into a phase difference between the oscillations of a carrier occurring during successive or adjacent T second time intervals. In a typical case, a 0° phase difference between the carrier oscillations during adjacent T second time intervals will correspond to the encoded form of one state (i.e., the + state) of the binary signal, while a 180° phase difference will correspond to the encoded form of the other state (i.e., the − state) of the signal.

It can be appreciated that when employing a DC-PSK signal to transmit a binary signal, suitable detection apparatus must be provided at the system receiver in order to properly convert the transmitted differential phase-shifts into their corresponding binary states. In particular, such receiver detection apparatus generally comprises a down converter which down converts the carrier frequency of the received DC-PSK signal to a preselected intermediate frequency level by mixing it with a locally generated oscillator signal. The resultant down converted DC-PSK signal is then applied to a differential phase signal detector which compares the phase of the signal with that of a replica of the signal which has been delayed by one T second time interval. From such comparison the phase detector generates an output analog signal which is a measure of the phase difference between the carrier oscillations occurring during adjacent T second time intervals and, hence, an output analog signal which is a direct measure of the encoded binary signal.

More specifically, during each T second interval in which the carrier oscillations of the signal and delayed replica thereof are in-phase, the phase detector develops an output signal of one polarity (e.g., a positive polarity) which is indicative of the transmission of one state (the + state) of the binary signal, while during each T second interval in which such oscillations are out of phase, the detector develops an output signal of opposite polarity (i.e., of negative polarity) which is indicative of the transmission of the other state (the − state) of the binary signal. To fully recover the binary signal, the aforesaid analog output signal is then applied to a sampling circuit which samples the signal at the midpoint of each T second time interval and generates an output pulse for each sample having a polarity equivalent to that of the sample and an amplitude and duration of uniform height and length.

While the above-described basic detection apparatus at the system receiver does provide adequate recovery of the binary signal when the carrier frequency of the down converted DC-PSK signal remains substantially unchanged, such is not the case when the carrier frequency varies due to drifts in the incoming carrier frequency and/or the frequency of the local oscillator. In the latter cases, the occurrence of variations in the carrier frequency of the down converted DC-PSK signal results in the generation of spurious responses which cause errors in the recovered binary signal. To avoid such spurious responses, it is thus necessary to control the carrier frequency of the down converted DC-PSK signal so it remains locked to its preselected intermediate frequency value. Unfortunately, however, in situations where the DC-PSK signal is broadband, conventional techniques for providing automatic frequency control of the carrier frequency have been found to be unacceptable.

It is thus a broad object of the present invention to provide suitable apparatus at the system receiver for controlling the carrier frequency of a received DC-PSK carrier signal.

SUMMARY OF THE INVENTION

In accordance with the principles of the present invention, automatic frequency control of the carrier frequency of a down converted DC-PSK signal is provided by multiplying the binary signal recovered from the DC-PSK signal with the output signal from a quadrature differential phase detector to develop an error control signal which is of substantially one polarity during an increase of the carrier frequency from its preselected intermediate frequency value and of substantially the opposite polarity during a decrease of the carrier frequency from such value. This aforesaid error control signal, after being averaged, is then applied to the local oscillator feeding the receiver down converter such that said one polarity of the averaged error signal, which polarity is indicative of an increase in the carrier frequency from its preselected value, causes a commensurate change in the local oscillator frequency, thereby decreasing the carrier frequency toward such value, and so that said opposite polarity of the averaged error signal, which polarity is indicative of a decrease in the carrier frequency from its preselected value, causes a commensurate change in the local oscillator frequency, thereby increasing the carrier frequency also toward such preselected value.

More particularly, the quadrature differential phase detector functions to compare the down converted DC-PSK signal with a replica of itself which has been delayed by a T second interval plug 90°. From such comparison, the detector develops an output analog signal whose polarity during a substantial portion of the duration of each pulse of the recovered binary signal is either the same as or opposite to the polarity of such pulse, depending upon whether the carrier frequency of the DC-PSK signal has increased or decreased from its preselected value. As a result, the output analog signal is always of substantially the same polarity as the recovered binary signal for one type of change of the carrier frequency relative to its preselected value (e.g., an increase in the carrier frequency therefrom) and always of substantially the opposite polarity for the opposite type change (a decrease, in the case of the aforesaid example) of the carrier frequency from such value. Multiplication of the aforesaid output analog signal and the recovered binary signal thus results in a product signal having substantially one polarity during such an increase in frequency of the carrier and substantially an opposite polarity during such a decrease in frequency of the carrier. The aforesaid product signal, hence, when averaged, has said one polarity during an increase of the DC-PSK carrier frequency from its preselected value and said opposite polarity during a decrease of the carrier from such value and, as a result, as above-indicated, can be employed as an error control signal to restore the carrier to such preselected value.

DESCRIPTION OF THE DRAWINGS

The above and other features and aspects of the present invention will become more apparent upon consideration of the following detailed description taken in conjunction with the following drawings in which.

DETAILED DESCRIPTION

Figure 1:
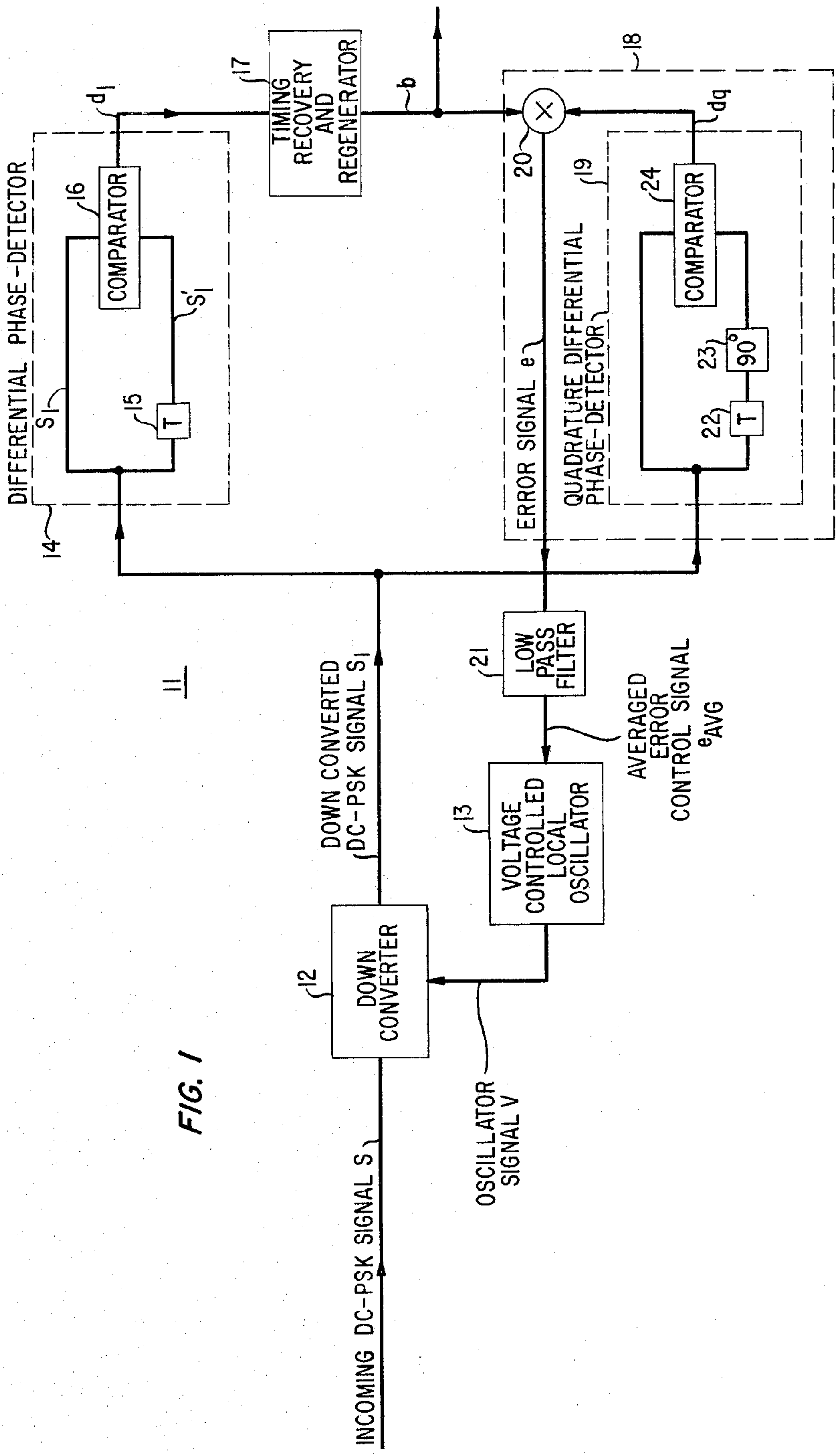
FIG. 1 shows an automatic frequency control arrangement in accordance with the principles of the present invention.

FIG. 1 shows, in block diagram form, an apparatus 11 for use in the receiver of a transmission system which transmits binary information via a DC-PSK signal $s$ which comprises a carrier at a carrier frequency $w_c$. More particularly, apparatus 11 includes a down converted 12 which is fed the incoming DC-PSK signal $s$ and an oscillator signal $v$ which is developed by a voltage controlled oscillator (VCO) 13. Down converter 12 mixes or multiplies the signals $s$ and $v$ to develop a DC-PSK signal $s_1$ at the difference or intermediate frequency $w_{if}$.

The incoming DC-PSK signal $s$ carries the binary signal being transmitted via the phase difference between its carrier oscillations occurring during successive or adjacent T second time intervals, where the time T is a function of the information rate of the binary signal. The aforesaid down conversion of the signal $s$ to the signal $s_1$ by down converter 12 must thus result in a carrier frequency $w_{if_o}$ for $s_1$ which preserves the phase relationship between the aforementioned signal oscillations. As a result, the frequency $w_o$ of local oscillator signal $v$ is initially set so that such a carrier frequency for $s_1$ is developed, i.e., is set so that the carrier frequency $w_{if} = (w_c - w_o)$ of $s_1$ is made equal to $w_{if_o}$.

Figures 2, 3, 4, 5, 6, 7:
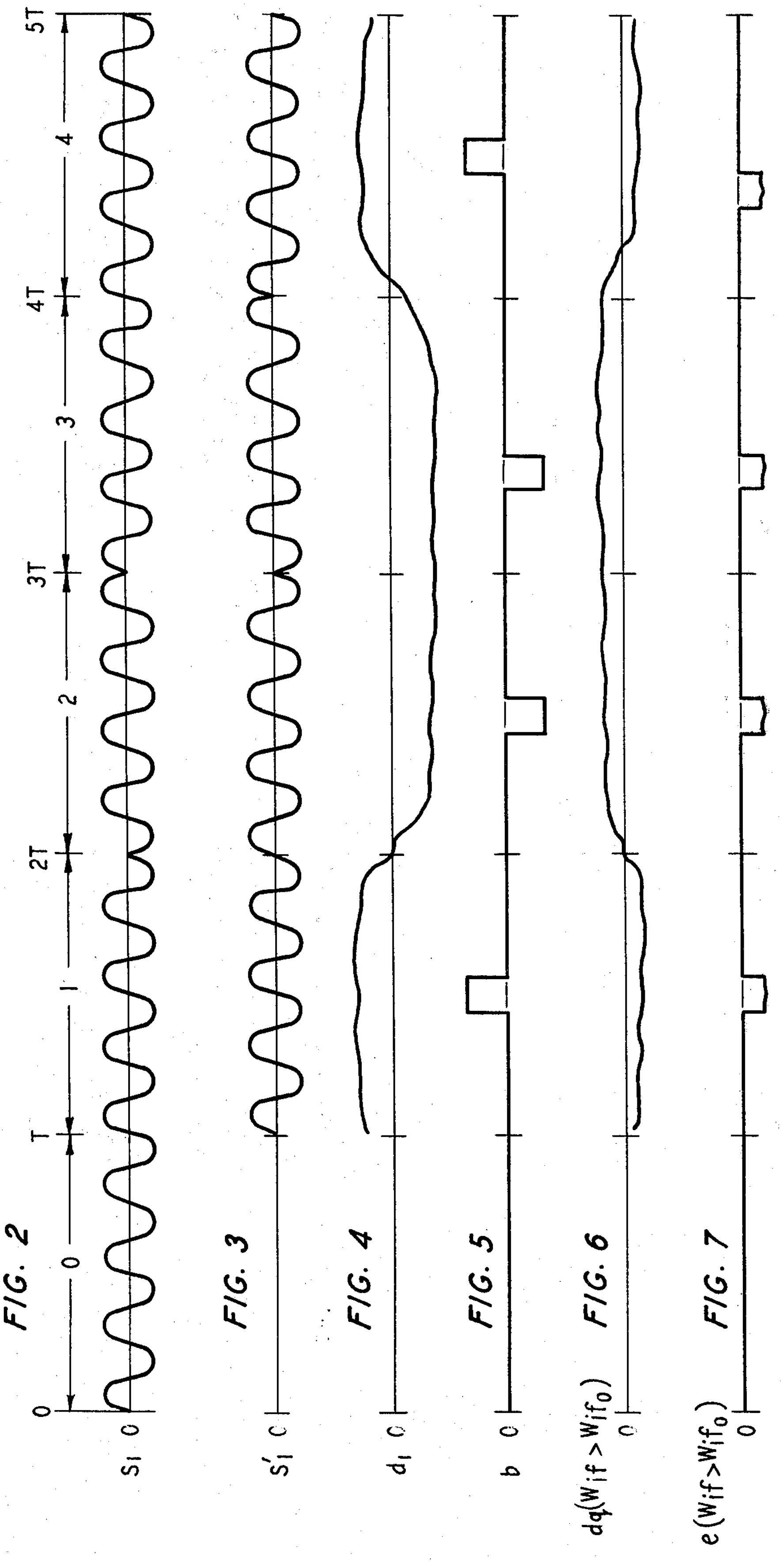
FIGS. 2–9 illustrate the signals appearing at various points in the arrangement of FIG. 1.

In FIG. 2, the down converted DC-PSK signal $s_1$ at the carrier frequency $w_{if_o}$ is illustrated. 5 T second intervals, labelled 0–5, of the signal $s_1$ are shown. As depicted, each such interval comprises an integer number of cycles (shown, illustatively, as 4 cycles) of the carrier $w_{if_o}$.

As above-indicated, the phase difference between the carrier oscillations of $s_1$ occurring during each set of successive or adjacent T second intervals represents the encoded form of a transmitted state of the transmitted binary signal. Thus, in FIG. 2, the differences in phase between the oscillations of $s_1$ during the sets of adjacent intervals 0–1, 1–2, 2–3 and 3–4 represent four transmitted states of the binary signal, the aforesaid four states being those occurring during the time intervals 1, 2, 3 and 4.

As can be observed from FIG. 2, the carrier oscillations of $s_1$ during the sets of adjacent intervals 0–1 and 3–4 are illustrated as having a 0° phase difference, while those during the sets of adjacent intervals 1–2 and 2–3 are illustrated as having a 180° phase difference. For purposes of discussion, it will be assumed that a 0° phase difference between the carrier oscillations of $s_1$ represents the encoded form of $a$ + state of the binary signal and a 180° phase difference the encoded form of a − state of the signal. Hence, the illustrated intervals of signal $s_1$ represent the four transmitted states + — and +.

The DC-PSK signal $s_1$ is coupled from down converter 12 to a conventional differential phase detector 14 which functions to develop from the signal $s_1$ and analog signal $d_1$ which corresponds to the binary signal being transmitted. In particular, detector 14, via delay element 15, operates to form a replica $s_1'$ of the signal $s_1$ which is delayed by a time T relative to $s_1$. Comparator 16 of the detector then acts to compare the phase of the signal $s_1'$ with the phase of the signal $s_1$ during each of the time intervals 1–4. If the phase difference between the signals during a particular interval is 0°, then the output developed by the comparator is of substantially one polarity (assumed for purposes of illustration to be a positive polarity) and, if the phase difference is 180° then the output developed is of substantially the opposite polarity (i.e., a negative polarity in this case, in view of the previous assumption). It thus can be appreciated that a substantially positive polarity output from detector 14 during an interval T indicates the transmission during the interval of a + state of the transmitted binary signal, while a substantially negative polarity output indicates the transmission during the interval of − state of such signal.

FIGS. 3 and 4 illustrate, respectively, the delayed signal $s_1'$ and the detector analog output signal $d_1$ resulting from comparing the phase of $s_1'$ to $s_1$ for the T second intervals 1–4. As is shown, the resultant detector output during the intervals 1 and 4 is substantially positive, thereby correctly indicating transmission of a + state of the binary signal during these intervals, while such output is substantially negative during the intervals 2 and 3, thereby correctly indicating transmission of a − state of the binary signal during these latter two intervals.

To fully recover the binary signal, the detector analog signal $d_1$ is applied to a conventional timing recovery and regenerator circuit 17. In particular, circuit 17 samples the signal $d_1$ during the intervals 1–4 and from such sampling produces an output pulse during each interval of uniform duration and amplitude and of a polarity identical to that of the substantially occurring polarity of the signal $d_1$ during such interval. The recovered binary signal $b$ of FIG. 5 thus results.

It can be appreciated that the ability of detector 14 and regenerator circuit 17 to correctly recover the binary signal being transmitted is dependent upon maintaining the carrier frequency $w_{if}$ of the DC-PSK signal $s_1$ at the frequency $w_{if_o}$. More particularly, as aboveindicated, any departure of such carrier frequency from $w_{if_o}$, due to drifts in the incoming carrier frequency $w_c$ and/or the local oscillator frequency $w_o$, results in disturbing the phase relationship between the oscillations of $s_1$ occurring during adjacent T second time intervals. Such disturbance is reflected as spurious outputs from detector 14, which outputs, in turn, cause errors to occur in the recovered binary signal $b$ developed by regenerator 17.

In order to insure against such errors, apparatus 11 is provided with an additional automatic frequency control apparatus 18 which acts to maintain the carrier frequency of the signal $s_1$ at the frequency $w_{if_0}$. More specifically, in accordance with the invention, apparatus 18 comprises a quadrature differential phase detector 19 and a multiplier or product circuit 20. As will be explained more fully hereinbelow, product circuit 20 receives the output $d_q$ of quadrature detector 19 and multiplies such output with the recovered binary signal $b$ to develop an error control signal $e$ which is of substantially one polarity when the carrier frequency $w_{if}$ of the signal $s_1$ has increased above the frequency $w_{if_0}$ and of substantially the opposite polarity when the carrier frequency $w_{if}$ has decreased below $w_{if_0}$. The aforesaid error signal $e$ is then averaged, via passage through a low pass filter 21, thereby resulting in an averaged error control signal $e_{avg}$ having said one polarity and said opposite polarity, said polarities being indicative of and occurring during, respectively, the aforementioned increase and decrease in the frequency $w_{if}$. The averaged error signal is then applied to the VCO 13 in typical servo loop fashion such that said one polarity of the averaged signal (assumed for illustrative purposes to be the negative polarity of the signal), which polarity is indicative of an increase in the carrier frequency above $w_{if_0}$, as aforesaid, causes an increase in the output oscillator frequency and, thus, a decrease in the carrier frequency back toward $w_{if_0}$, and such that said opposite polarity of the averaged signal, (positive polarity of the signal), which polarity is indicative of a decrease in the carrier frequency below $w_{if_0}$, also as aforesaid, causes a decrease in the output oscillator frequency and, hence, an increase in the carrier frequency again back toward $w_{if_0}$.

As indicated, the quadrature differential phase detector 19 develops its output signal $d_q$ in response to the DS-PSK signal $s_1$ being applied thereto. More particularly, detector 19 acts, via a delay element 22 and a 90° phase-shifter 23, to first generate a replica of the signal $s_1$ which is delayed by a T second time interval plus an additional 90° relative thereto. The detector then compares the delayed signal with the signal $s_1$ in a comparator 24 such that an output analog signal (the detector output signal $d_q$) is developed which has a polarity during a substantial portion of each of the T second intervals 1–4 which is the same as or opposite to the polarity of the recovered binary signal $b$ during such interval, depending upon whether there has been an increase or decrease in the carrier frequency $w_{if}$ above or below $w_{if_0}$.

The detector output signal $d_q$ is thus always of substantially the same polarity as the recovered signal $b$ in the case of one type of change in the carrier frequency $w_{if}$ (for example, an increase of $w_{if}$ above $w_{if_0}$) and of substantially the opposite polarity to the signal $b$ in the case of the opposite type change in $w_{if}$ (a decrease in $w_{if}$ below $w_{if_0}$). As a result, the product of the two signals $d_q$ and $b$ is itself always of substantially one polarity during the former type of change and of substantially the opposite polarity during the latter type of change, as above-indicated.

The aforesaid result can be further illustrated by assuming that during an increase in the carrier frequency $w_{if}$ above $w_{if_0}$, the signal $d_q$ developed by quadrature detector 19 is of substantially opposite polarity to the recovered binary signal $b$. This means, of course as above-discussed that the signal $d_q$ developed by detector 19 will be of substantially the same polarity as the signal $b$ for a decrease in $w_{if}$ below $w_{if_0}$. If it is further assumed, moreover, that the carrier frequency $w_{if}$ had been increased during the illustrated intervals of $s_1$ then the signal $d_q$ developed by detector 19 during the intervals 1–4 would be substantially opposite polarity to the signal $b$, as is shown in FIG. 6. Multiplication of the signal $d_q$ with $b$ thus results in error signal $e$ having substantially all negative polarities, as shown in FIG. 7. As is apparent, such an error signal, when averaged, results in a negative polarity signal which, as above-indicated, increases the frequency of VCO 13, thereby decreasing the carrier frequency back to $w_{if_0}$.

Figure 8:
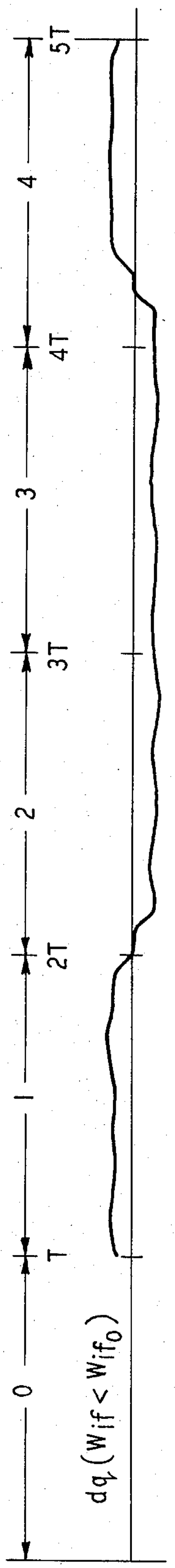
Figure 9:
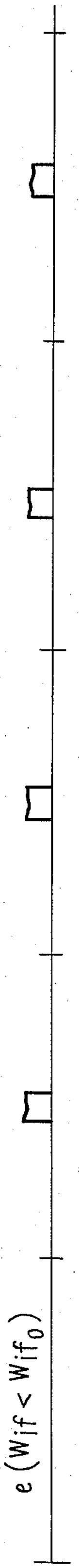

If, on the other hand, however, it is assumed that the carrier frequency $w_{if}$ had been decreased below $w_{if_0}$ during the illustrated intervals of $s_1$, then the signal $d_q$ developed by detector 19 during the intervals 1–4 would be of substantially the same polarity as the signal $b$, as shown in FIG. 8. Multiplication of the signal $d_q$ with $b$ in this case thus results in an error signal $e$ having substantially all positive polarities, as shown in FIG. 9. As is also apparent such an error signal, when averaged, results in a positive polarity signal which, as above-indicated decreases the frequency of VCO 13, thereby increasing the carrier frequency $w_{if}$ back to $w_{if_0}$.

Figure 10:
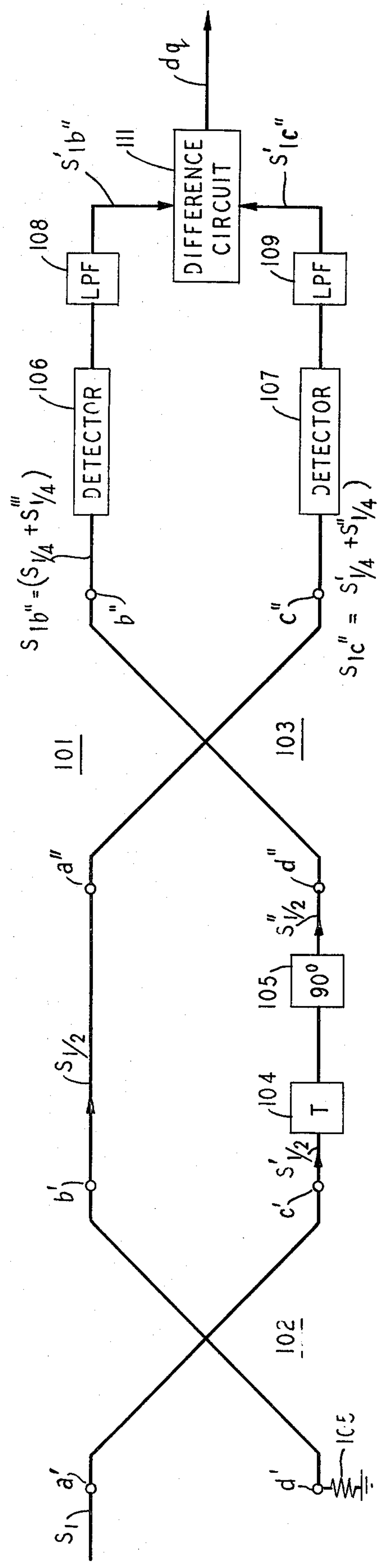
FIG. 10 shows a circuit arrangement which can be employed to perform the function of the quadrature differential phase detector included in the apparatus of FIG. 1.

In FIG. 10, a specific circuit arrangement 101 which can be employed to perform the function of the quadrature detector 19 is illustrated. As shown, the arrangement comprises first and second 3$db$ hybrid couplers 102 and 103 having ports $a'$, $b'$, $c'$, $d'$ and $a''$, $b''$, $c''$, $d''$, respectively.

Port $a'$ of coupler 102 serves as the input port of the detector 101. Ports $b'$, $c'$ and $d'$ of coupler 102, are connected, respectively, to port $a''$ of coupler 103, to the input end of a T second delay element 104 and to a terminating resistance 105. The output end of delay element 104 is connected, in turn, to the input end of a 90° phase-shifter 105 whose output end is coupled to port $d''$ of coupler 103.

The remaining two ports $b''$ and $c''$ of coupler 103 serve as inputs to detectors 106 and 107, respectively, each of which typically might be a square law device. The outputs of detectors 106 and 107 are, in turn, coupled through low pass filters 108 and 109, respectively, to a difference circuit 111 whose output is the desired signal $d_q$.

Hybrid couplers 102 and 103 are conventional couplers which couple signals applied to their $a$ and $d$ ports in a similar manner. In particular, a signal applied to the $a$ port of each coupler is split equally between the $b$ and $c$ ports thereof, with the signal coupled to the $b$ port experiencing a 0° relative phase-shift and the signal coupled to the $c$ port a 90° relative phase-shift. Similarly, a signal applied to the $d$ port of each coupler is split equally between the $b$ and $c$ ports thereof, with the signal coupled to the $b$ port experiencing a 90° relative phase-shift and the signal to the $c$ port a 0° relative phase-shift.

In operation, the down converted DC-PSK signal $s_1$ is applied to a port $a'$ of coupler 102. The signal $s_1$ is equally split between the ports $b'$ and $c'$ so that appearing at these ports are the signals $s_{1/2}$ and $s'_{1/2}$, respectively, where $s_{1/2}=(s_1)/2$ and $s'_{1/2}$ equals $s_{1/2}$ shifted in phase by 90°. The signal $S_{1/2}$ is then coupled directly to port $a''$, while the signal $s'_{1/2}$ is delayed for a time T and phase-shifted an additional 90° in passing through elements 104 and 105, respectively, and thus arrives at port $d''$ of coupler 103 as the signal $s''_{1/2}$.

The signal $s_{1/2}$ at port $a''$ is split between the ports $b''$ and $c''$ of coupler 103 so that appearing at these ports are the signals $s_{1/4}$ and $s'_{1/4}$, where $s_{1/4} = (s_{1/2})/2$ and $s'_{1/4}$ equals $s_{1/4}$ shifted in phase by 90°. Similarly, the signal $s''_{1/2}$ at port $d''$ is also split between the ports $b''$ and $c''$ so that due to this latter signal the signal $s''_{1/4} = (s''_{1/2})/2$ appears at port $c''$ and the signal $s'''_{1/4}$ which is equal to $s''_{1/4}$ shifted in phase by 90° appears at the port $b''$. The total signal at port $b''$ of coupler 93 is thus the sum signal $s_{1b} = (s_{1/4} + s'''_{1/4})$, while total signal at port $c''$ of the coupler is the sum signal $s_{1c} = (s'_{1/4} + s''_{1/4})$.

The signals $s_{1b''}$ and $s_{1c''}$ are then coupled from the ports $b''$ and $c''$ through their respective square law detectors 106 and 107 and low pass filters 108 and 109, whereby the envolopes of the signals are detected, thereby resulting in the low frequency positive polarity signals $s'_{1b''}$ and $s'_{1c''}$. These latter two signals are applied to the inputs of difference circuit 111 wherein they are subtracted to produce the output signal $d_q$.

In order to observe that the signal $d_q$ from detector circuit 101 is equivalent to that produced by quadrature differential phase detector 19 of FIG. 1, such output will now be determined for the cases of the carrier frequency $w_{if}$ of $s_1$ being equal to, greater than and less than the desired frequency $w_{if_0}$.

Figures 11, 12, 13, 14, 15, 16:
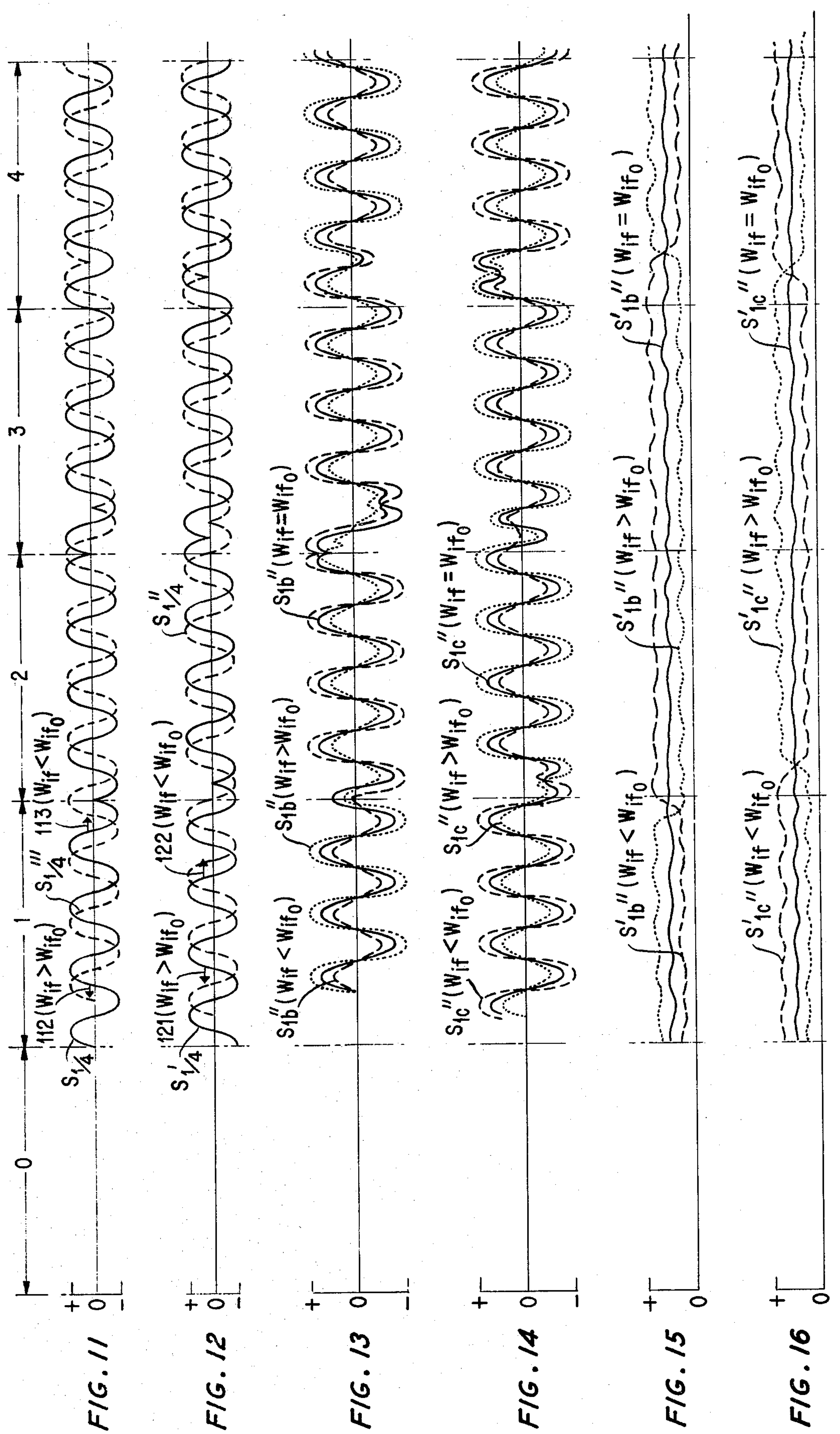
FIGS. 11–16 illustrate the signals appearing at various points in the circuit of FIG. 10.

More particularly, the signals $s_{1/4}$ and $s'''_{1/4}$ in the intervals 1–4 are plotted in FIG. 11 for the case where $w_{if} = w_{if_0}$. Similarly, the signals $s'_{1/4}$ and $s''_{1/4}$ are plotted in FIG. 12 for the same case. As can be seen from these figures, when $w_{if} = w_{if_0}$ the pair of signals $s_{1/4}$ and $s'''_{1/4}$ are out of phase by equivalent amounts (either +90° or −90°) during each of the intervals 1–4, as are the pair of signals $s'_{1/4}$ and $s''_{1/4}$. Such phase relationships between the aforesaid pairs of signals cause the sum signals $s_{1b''}$ and $s_{1c''}$ resulting therefrom to be equivalent, each having a substantially equal amplitude and phase in each of the plotted intervals, as can be seen in FIGS. 13 and 14. The equivalence between the signals $s_{1b''}$ and $s_{1c''}$, in turn, causes the positive polarity output signals $s'_{1b''}$ and $s'_{1c''}$, illustrated in FIGS. 15 and 16, to be of substantially equal amplitude. The subtraction of the signals $s'_{1b''}$ and $s'_{1c''}$ in difference circuit 111 thus results in a zero output for $d_q$, thereby correctly indicating that $w_{if}$ is at the desired frequency $w_{if_0}$.

If, however, the frequency $w_{if}$ had been increased from $w_{if_0}$ during illustrated intervals, such an increase in $w_{if}$ would have resulted in shifting the signal $s_{1/4}$ further to the left on the time scale relative to the signal $s'''_{1/4}$, as is indicated by the arrow 112 in FIG. 11. As a result of such a shift, the signals $s_{1/4}$ and $s'''_{1/4}$ become more out of phase (their phase difference increases toward 180°) in those intervals where the signals were +90° out of phase at $w_{if_0}$ (the intervals 2 and 3), thereby decreasing the amplitude of the sum signal $s_{1b''}$ in such intervals. In those intervals where the signals were −90° out of phase at $w_{if_0}$ (the intervals 1 and 4), however, the opposite occurs. That is, the signals become more in phase (their phase difference decreases toward 0), thereby increasing the sum signal $s_{1b''}$. Thus, as shown in FIG. 13, for $w_{if} > w_{if_0}$ the sum signal $s_{1b''}$ has an increased amplitude in intervals 1 and 4 and a decreased amplitude in the intervals 2 and 3. This amplitude change in $s_{1b''}$ is similarly reflected in the amplitude of the output signal $s'_{1b''}$ thus causing the latter signal to have an increased amplitude in intervals 1 and 4 and a decreased amplitude in intervals 2 and 3, as shown in FIG. 15.

An increase in the frequency $w_{if}$ above $w_{if_0}$ in the illustrated intervals, would likewise have resulted in shifting the signal $s'_{1/4}$ further to the left on the time scale relative to the signal $s''_{1/4}$, as indicated by the arrow 121 in FIG. 12. As a result of such a shift, the latter two signals become more out of phase in these intervals where they were +90° out of phase at $w_{if_0}$ (the intervals 1 and 4) and more in phase in these intervals where they were −90° at $w_{if_0}$ (the intervals 2 and 3). The resultant sum signal $s_{1c''}$ and hence the output signal $s'_{1c''}$ are thus both increased in amplitude in the latter two intervals and decreased in amplitude in the former two intervals, as shown in FIGS. 14 and 16.

It can be appreciated that the above-described change in the sum signals $s'_{1b''}$ and $s'_{1c''}$ which occurs when $w_{if}$ is increased above $w_{if_0}$, cause a corresponding change in the difference output signal $d_q$. In particular, assuming difference circuit 111 subtracts the sum signal $s'_{1b'}$ from $s'_{1c'}$, it is apparent that the difference signal $d_q$ will have a positive polarity during a substantial portion of the intervals 2 and 3 and a negative polarity during a substantial portion of the intervals 1 and 4, which is precisely the indicated form of $d_q$ shown in FIG. 6 for an increase in $w_{if}$ above $w_{if_0}$.

Having thus observed that detector 101 produces the proper output signal in the case of $w_{if}$ being increased above $w_{if_0}$, the behavior of the detector will now be examined under the assumption that $w_{if}$ had been decreased below $w_{if_0}$ during the illustrated intervals of $s_1$. Under such a circumstance, the signal $s_{1/4}$ would have been shifted further to the right on the time scale relative to the signal $s'''_{1/4}$, as indicated by the arrow 113 in FIG. 11. As a result, in the intervals 1 and 4, the two signals become more out of phase, thereby causing the signals $s_{1b''}$ and $s'_{1b''}$ to be decreased in amplitude in these intervals (see FIGS. 13 and 15). In the intervals 2 and 3, however, the signals become more in phase with the result that the signals $s_{1b''}$ and $s'_{1b''}$ are increased in amplitude.

Similarly, a decrease in the frequency $w_{if}$ below $w_{if_0}$ would have caused the signal $s'_{1/4}$ to be shifted further to the right on the time scale relative to the signal $s''_{1/4}$, as indicated by the arrow 122 in FIG. 12. As a result, in the intervals 1 and 4 the two signals become more in phase and in the intervals 2 and 3 more out of phase. The resultant signals $s_{1c}''$ and $s'_{1c}''$ hence, have an increased amplitude in the former intervals and a decreased amplitude in the latter intervals, as shown in FIGS. 14 and 16.

Subtraction of the signal $s'_{1b''}$ from $s'_{1c''}$ in difference circuit 111 thus results in an output signal $d_q$ having a positive polarity during a substantial portion of the intervals 1 and 4 and negative polarity during a substantial portion of the intervals 2 and 3, which again is precisely the form of $d_q$ for $w_{if}$ decreased below $w_{if_0}$ as shown in FIG. 8.

In all cases, it is understood that the above-described arrangements are merely illustrative of some of the many possible specific embodiments which represent applications of the present invention. Numerous and varied other arrangements can readily be devised in accordance with these principles without departing from the spirit and scope of the invention. For example, in the discussion, hereinabove, it was implicitly assumed that the carrier frequency $w_c$ was greater than the local oscillator frequency $w_o$. However, the principles of the invention are applicable, as well, when $w_c < w_o$. In such a case, the signal $e_{avg}$ would be applied to VCO 13 so as to decrease its frequency when $w_{if}$ increased above $w_{if_0}$ and, similarly, to increase its frequency when $w_{if}$ decreased below $w_{if_0}$. Additionally, the binary signal being transmitted via the DP-PSK signal $s_1$ could have been carried via other phase differences than those illustrated. Thus, for example, phase differences of +90° and −90° could have also been employed.

What is claimed is:

1. Apparatus for use in a receiver which receives a DC-PSK signal, said signal comprising a carrier at a frequency $w_c$ which provides a means for carrying first and second states of a transmitted binary signal via first and second phase differences, respectively, between the oscillations of said carrier occurring during successive T second intervals comprising oscillator means for generating an oscillating signal at a frequency $w_o$;

down converter means for mixing said DC-PSK signal and said oscillating signal to produce a down converted DC-PSK signal at an intermediate difference frequency $w_{if}$;

differential phase detector means responsive to said down converted signal for recovering therefrom a recovered binary signal which corresponds to said transmitted binary signal, said recovered binary signal comprising opposing polarity pulses which correspond, respectively, to said first and second states of said transmitted binary signal;

quadrature differential phase detector means also responsive to said down converted signal for generating an output signal having a polarity during a substantial portion of the duration of each of said pulses which is the same as or opposite to the polarity of such pulse depending upon whether said frequency $w_{if}$ is above or below a preselected frequency $w_{if_0}$;

means for multiplying said recovered binary signal with said output signal, thereby developing an error control signal having substantially one polarity when said frequency $w_{if}$ is above $w_{if_0}$ and substantially the opposite polarity when said frequency $w_{if}$ is below $w_{if_0}$;

and means for applying said error control signal to said local oscillator to control said frequency $w_o$ such that said frequency $w_{if}$ is maintained at $w_{if_0}$.

2. Apparatus in accordance with claim 1 in which:

each of said pulses is associated with a particular one of the T second intervals of said carrier, and each pulse is of one polarity if the phase difference between the carrier oscillations of its associated interval and the carrier oscillations of the immediately preceding interval is equal to said first phase difference and each is of a polarity opposite to said one polarity if the phase difference between the carrier oscillations of its associated interval and carrier oscillations of the immediately preceding interval is equal to said second phase difference;

and said output signal has a polarity during a substantial portion of each of said intervals which is the same as or opposite to polarity of the pulse associated with such interval, depending upon whether said frequency $w_{if}$ is above or below said frequency $w_{if_0}$.

3. Apparatus in accordance with claim 1 in which said means for applying includes means for averaging said error control signal.

4. Apparatus in accordance with claim 1 in which said differential phase detector means comprises:

delay means responsive to said down converted signal for producing a delayed signal which is a replica of said down converted signal and which is delayed by T seconds relative thereto;

and comparator means for comparing the phases of said delayed signal and said down converted signal.

5. Apparatus in accordance with claim 1 in which said first and second phase differences are 0° and 180°, respectively.

6. Apparatus in accordance with claim 1 in which said quadrature detector means comrpises:

a delay means responsive to said down converted signal for generating a quadrature delayed signal which is a replica of said down-converted signal and which is delayed by T seconds plus 90° relative thereto;

and means for comparing the phases of said quadrature delayed signal and said down converted signal.

7. Apparatus in accordance with claim 1 in which said quadrature detector comprises:

first and second hybrid couplers, each having first, second, third, and fourth ports, said first port of said first coupler being responsive to said down converted signal and said second port of said first coupler being connected to said first port of said second coupler;

a delay means for providing a T second plus 90° delay to signals passing therethrough, said delay means being connected between said third port of said first coupler and fourth port of said second coupler;

a difference circuit whose output comprises said output signal, said difference circuit having first and second input ports;

a first envelope detector connected between said second port of said second coupler and said first input port;

and a second envelope detector connected between said third port of said second coupler and said second input port.

8. Apparatus in accordance with claim 7 in which each of said couplers is a 3db hybrid coupler.

9. Apparatus in accordance with claim 7 in which a signal applied to the first port of each of said couplers is equally divided between said second and third ports thereof, with the portion of the signal appearing at the second port receiving a 0° relative phase shift and the portion appearing at the third port a 90° relative phase-shift;

and a signal applied to the fourth port of each of said couplers is equally divided between said second and third ports thereof, with the portion of the signal appearing at the third port receiving a 0° relative phase shift and the portion appearing at the second port a 180° relative phase-shift.

10. Apparatus in accordance with claim 1 in which said output signal is of substantially the opposite polarity to said binary signal when $w_{if}$ is above $w_{if_0}$ and is of substantially the same polarity as said binary signal when $w_{if}$ is below $w_{if_0}$.

11. Apparatus in accordance with claim 8 in which said error control signal is of substantially a negative polarity when $w_{if}$ is above $w_{if_0}$ and said error control signal is of substantially a positive polarity when $w_{if}$ is below $w_{if_0}$.

* * * * *